United States Patent [19]
Abe et al.

[11] Patent Number: 5,749,586
[45] Date of Patent: May 12, 1998

[54] GASKET FOR SANITARY PIPING AND METHOD OF MANUFACTURING THE SAME

[75] Inventors: Makoto Abe; Katsuo Wada; Takeshi Miyoshi, all of Hyogo; Tosiyasu Tanimura; Tetsuya Akai, both of Kyoto, all of Japan

[73] Assignee: Nippon Pillar Packing Co., Ltd., Osaka, Japan

[21] Appl. No.: 666,274

[22] PCT Filed: Oct. 23, 1995

[86] PCT No.: PCT/JP95/02195

§ 371 Date: Jun. 20, 1996

§ 102(e) Date: Jun. 20, 1996

[87] PCT Pub. No.: WO96/12903

PCT Pub. Date: Feb. 5, 1996

[30] Foreign Application Priority Data

Oct. 24, 1994 [JP] Japan ................... 6-257823

[51] Int. Cl.⁶ .................................... F16J 15/00
[52] U.S. Cl. ............... 277/608; 277/627; 277/650; 264/127; 264/234
[58] Field of Search .................. 264/127, 234; 428/66.4; 277/207 A, DIG. 6, 229, 167.5, 608, 627, 650

[56] References Cited

U.S. PATENT DOCUMENTS 2,951,721 9/1960 Asp ........................... 277/227
4,106,782 8/1978 Hyde et al. .................. 277/235 A
4,176,434 12/1979 Cromwell et al. ............ 277/235 A

FOREIGN PATENT DOCUMENTS 449811 7/1948 Canada ..................... 264/127
4746454 11/1972 Japan .
4331876 11/1992 Japan .
599343 4/1993 Japan .

*Primary Examiner*—Daniel G. DePumpo
*Attorney, Agent, or Firm*—Griffin, Butler, Whisenhunt & Szipl

[57] ABSTRACT

A gasket for use in sealing sanitary piping comprises an annular plate of porous polytetrafluoroethylene, the inner surface layer of the gasket being heat treated to form a pore-free fused solidified layer for directly contacting a fluid to be sealed. The fused solidified layer prevents osmotic leakage of sealed fluid. Since the solidified layer is formed only in the surface layer the intrinsic properties of porous polytetrafluoroethylene, such as flexibility and affinity, are retained. The gasket is made by inserting a tubular member with an internal heater into a porous polytetrafluoroethylene gasket so that the tubular member directly contacts the inner surface layer of the gasket. The tubular member is operated at a temperature of 420° to 460° C. and contacts a gasket for 10 to 30 seconds to form the fused and pore-free layer.

8 Claims, 2 Drawing Sheets

GASKET FOR SANITARY PIPING AND METHOD OF MANUFACTURING THE SAME

FIELD OF THE INVENTION

The present invention relates to a porous polytetrafluoroethylene gasket and a method of making the gasket. The gasket is particularly suitable for use in the joint areas of sanitary piping such as the piping used in equipment for manufacturing medicines, foods and other products where sanitary conditions are required.

BACKGROUND OF THE INVENTION

The joint structure of sanitary piping is generally constituted such that coupling ferrules, or confronting piping end flanges, are connected or pressed together by a clamp band with the gasket being pressed between the ferrules or flanges. The specifications for joint structures including such gaskets for sanitary piping are prescribed by the International Standardization Organization in ISO-2852.

Known gaskets for sanitary piping include, generally, annular gaskets made of silicone rubber or other rubber, or annular gaskets made of polytetrafluoroethylene (PTFE), having annular protrusions projecting concentrically from both faces of the gaskets. The protrusions engage with annular recesses formed on the confronting surfaces of the ferrules so as to position the gasket relative to the ferrules.

However, rubber gaskets are not suited to sanitary piping where a high degree of cleanliness is required because plasticizers are likely to exude from the rubber over long periods of use. Furthermore, according to recent practice, the sanitary piping is subjected to steam sterilization treatment more frequently, and the steam sterilization treatment temperature tends to be higher. When steam sterilization treatment is done frequently in high temperature conditions, the rubber gasket deteriorates in a relatively short period of time. The deterioration leads to a lowering of elasticity (the gasket becomes stiff), the formation of cracks, surface peeling, and a drop off the sealing function. Thus, the rubber gasket has disadvantages with respect to cleanliness and durability, and is not well suited for use as a gasket for sanitary piping.

Owing to the properties of polytetrafluoroethylene, a polytetrafluoroethylene gasket does not have the disadvantages associated with a rubber gasket. However, a gasket made of polytetrafluoroethylene is stiff and is hence inferior in flexibility, affinity and resilience or restoration. Therefore, to exhibit a specific sealing function, an extremely large tightening torque is needed. Frequent retightening is necessary, and it is difficult to recover the sealing function by repeated retightening.

As a means for solving the problems associated with gaskets made of silicone rubber or polytetrafluoroethylene, it has recently been proposed that an annular gasket for sanitary piping (hereinafter called "conventional gasket") be composed of porous polytetrafluoroethylene. This gasket is made of polytetrafluoroethylene made porous by drawing (for example, see Japanese Laid-open Patent No. 5-99343).

Porous polytetrafluoroethylene is a soft material hence a gasket made of this material possesses an excellent flexibility, affinity and restoration not obtained in the usual polytetrafluoroethylene gasket, while maintaining the intrinsic properties of polytetrafluoroethylene such as durability, cleanliness, and resistance to chemicals, and may be used satisfactorily in severe sealing conditions in sanitary piping.

In the conventional gasket, since it is made of porous material, the sealed fluid may permeate from the inner circumferential parts of the gasket which are in direct contact with the sealed fluid, thereby causing so-called osmotic leak. Such osmotic leak is not significant when the sealed fluid is liquid, but is a serious problem when the gasket is used as a gas seal or vacuum seal.

To reduce osmotic leak, the forming density of the gasket may be increased but increasing the forming density has its own limit, and it is impossible to prevent osmotic leak completely. Furthermore, when the forming density is heightened more than necessary, the intrinsic properties (flexibility, etc) of the porous polytetrafluoroethylene are sacrificed, and the advantages of using porous polytetrafluoroethylene as the constituent material are lost.

Unlike silicon rubber or the like, porous polytetrafluoroethylene, cannot be fused and formed in a die. At the present time there is no known method for forming a porous polytetrafluoroethylene gasket other than by compressing and forming a sheet material into a specific annular plate form by using a die. Therefore, since a gasket for sanitary piping is not, generally, flat on both surfaces, but is in the form of an annular plate with uneven thickness and having projecting protrusions on both faces as mentioned above, it is impossible to have a uniform density in the entire gasket, including the protrusions, by compressive forming with a die. In particular the portions forming protrusions tend to have a lower density than other parts. Thus, in the conventional gasket made of porous polytetrafluoroethylene and having protrusions on both sides, the gasket density is uneven locally, and the sealed fluid may permeate and stay in low density portions (in particular, the protrusion areas). This osmotic fluid may degenerate over a long period of use, and may lead to formation of pyrogen, a heat generating substance which may in turn induce undesired problems from the sanitary viewpoint in the manufacturing process of medicines and foods. Thus in the conventional annular gasket made of porous polytetrafluoroethylene, osmotic leak is an inherent defect characteristic of the material which substantially limits its application.

SUMMARY OF THE INVENTION

An object of the invention to provide a gasket for sanitary piping capable of securely preventing osmotic leak which is an inherent material defect in the gasket made of porous polytetrafluoroethylene, without sacrificing the characteristics and significance of using porous polytetrafluoroethylene as the constituent material.

The object is achieved by forming the gasket from sanitary porous polytetrafluoroethylene in an annular shape the gasket having a pore-free layer solidified after being fused (hereinafter referred to as fused solidified layer) the layer forming an inner circumferential surface layer of the gasket which directly contacts the sealed fluid. The fused solidified layer may be either uniform in thickness or non-uniform. For example, its middle portion may be thicker in the radial direction of the gasket than its end portions at the faces of the gasket.

When a pore-free fused solidified layer is formed in the inner circumferential part of the gasket directly contacting with the sealed fluid, osmotic leak from this area is prevented although the gasket is composed of a porous material. Furthermore, the fused solidified layer is formed only at the inner circumferential surface layer of the gasket. The intrinsic properties of the porous polytetrafluoroethylene such as flexibility and affinity are not sacrificed at all by the gasket as a whole, and the advantages of using porous polytetrafluoroethylene as the gasket constituent material are not lost. Therefore, according to the gasket of the invention, without sacrificing the original characteristics of the gasket made of porous polytetrafluoroethylene, its inherent defect of osmotic leak from the inner circumferential parts of the gasket is securely prevented. The sealing characteristics (gas sealing property, airtight holding property, etc.) of the gasket of porous polytetrafluoroethylene are substantially enhanced as compared with those of the conventional gasket, so that the applications of the gasket may be significantly expanded.

It is another object of the invention to provide a method of manufacturing a gasket for sanitary piping possessing such structure for preventing osmotic leak. According to this method an annular gasket of porous polytetrafluoroethylene (obtained by a conventional method) is provided with the osmotic leak preventive structure by heating, fusing, cooling and solidifying an inner circumferential surface portion of the gasket to form a pore-free fused solidified surface layer for contacting a sealed fluid.

The fusing and solidifying of the surface layer is preferably carried out at a temperature of 420° to 460° C. for a period of 10 to 30 seconds. The heating and fusing treatment of the surface layer is carried out in a preferred manner by bringing a heated metal material into contact with the entire surface layer.

DESCRIPTION OF PREFERRED EMBODIMENTS

Figure 1:
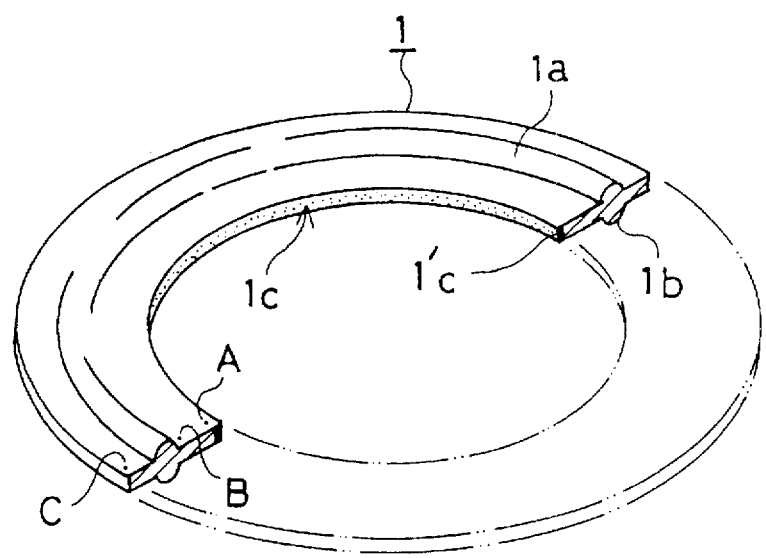
FIG. 1 is a perspective cut-away view showing a gasket according to the invention, the gasket being suitable for use in sanitary piping.

FIG. 1 is a perspective cut-away view of a preferred embodiment of a gasket 1 according to the invention. The gasket 1 comprises an annular plate-like element having annular protrusions or ridges 1a, 1b extending outwardly from the two opposite surfaces of the gasket.

Figure 2:
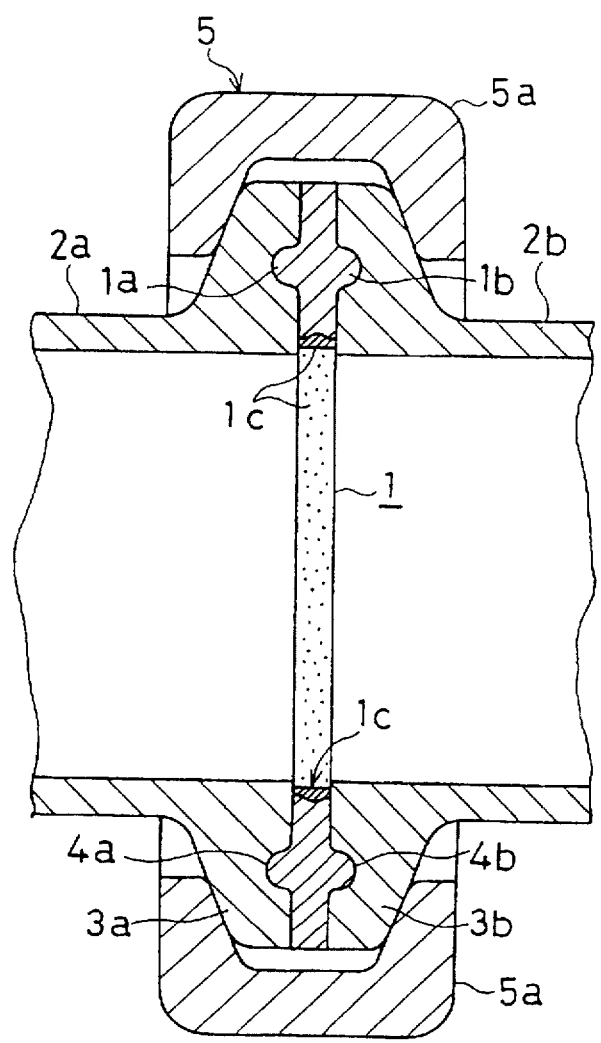
FIG. 2 is a longitudinal sectional view showing a sanitary piping joint structure provided with the same gasket; and, FIG. 3 is a view of essential parts of FIG. 2 on an enlarged scale

As shown in FIG. 2, gasket 1, when in use, is clamped between ferrules 3a, 3b formed at the ends of two sections of sanitary pipe 2a, 2b and functions to seal the joint between the two pipe sections. The end surfaces of pipe sections 2a, 2b are provided with annular recesses 4a, 4b for receiving the annular protrusions 1a, 1b on the gasket. When the protrusions 1a, 1b are positioned within recesses 4a, 4b, the gasket is concentrically positioned relative to the two pipe sections.

A clamp band 5 is provided for holding the pipe sections 2a, 2b together. As clamp band 5 is tightened onto ferrules 3a, 3b, the pipe sections are drawn together so that the gasket 1 is compressed and held tightly between the ferrules.

Figure 3:
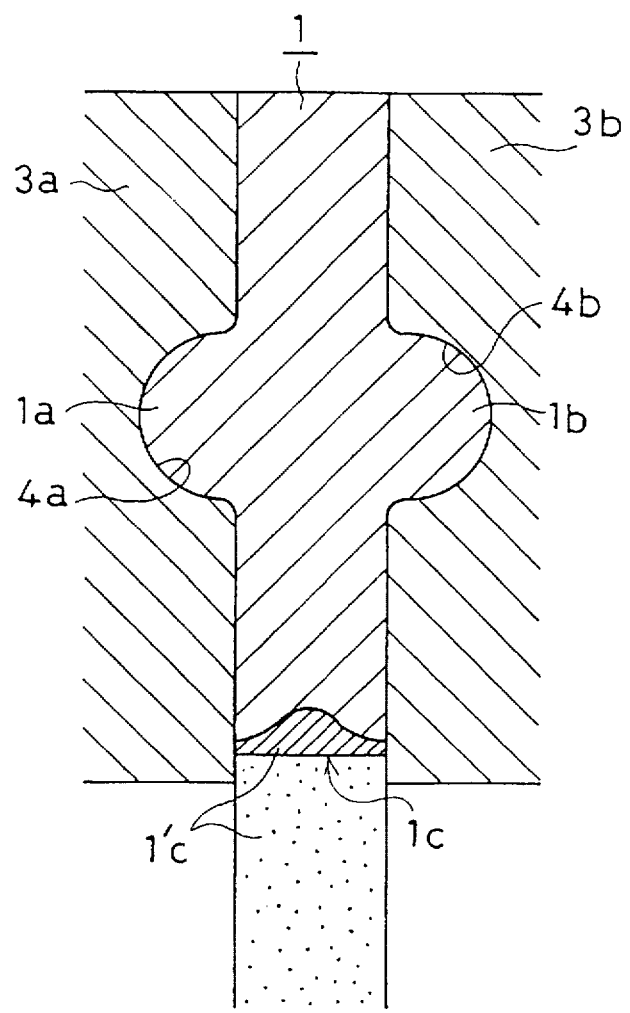

The clamp band 5 generally comprises two or three arcuate segments 5a coupled together in an annular form by screws (not shown) so that the diameter of the clamp band may be reduced. As the diameter of the clamp band is reduced, the clamp band acts against ferrules 3a, 3b thus forcing the ferrules toward each other and compressing the gasket 1 between the ferrules. The joint structure of such sanitary piping is specified by the International Standardization organization in ISO-2852. When the surface pressure of the gasket 1 is properly set by the tightening torque of clamp band 5 acting against ferrules 3a, 3b, the ferrules are sealed by the gasket 1. As shown in FIGS. 2 and 3 inner circumferential part 1c of the gasket which, is not covered by the ferrules 3a, 3b, is exposed so that it may directly contact the sealed fluid in the pipings 2a, 2b. As discussed above, osmotic leak may occur through circumferential part 1c if the gasket 1 is made of porous polytetrafluoroethylene without further treatment.

According to the invention osmotic leak is effectively prevented by providing the gasket with an osmotic leak prevention structure wherein the surface layer of the entire inner periphery or circumferential part 1c of the gasket is formed by a pore-free fused solidified layer 1'c as best seen in FIG. 3. Since the layer 1'c is solidified and has no pores, it forms a barrier preventing osmotic leakage of sealed fluid into the gasket from the interior of the sanitary piping.

The gasket 1 is made from a starting raw material of polytetrafluoroethylene. The raw material is pressed by rolls to undergo crystal orientation treatment and drawn by rubber lined pinch rolls at a draw rate of 100 to 300% and a temperature of less than 327° to produce a sheet of porous polytetrafluorethylene having a porosity rate of 40 to 86%. The gasket 1 with protrusions 1a, 1b is then obtained by press forming with use of a die, a piece of annular material cut out of the sheet of porous polytetrafluorethylene.

The osmotic pressure prevention structure 1'c is then fabricated by heating and fusing the surface layer of the gasket inner circumferential part 1c, then cooling and solidifying it. Such heat treatment may be accomplished using various techniques. Considering that the gasket 1 is annular, the fused solidified layer 1'c may be formed by using a tubular metal member provided with an internal heater.

More specifically, the metal member is tubular, and has an outside diameter nearly identical to the inside diameter of the gasket 1. The metal member is heated by the heater to a proper temperature over the melting point of the porous polytetrafluoroethylene, preferably to a temperature of 420° C. to 460° C. The gasket 1 is then fitted and held on the metal member so that the entire circumference of the gasket inner part 1c uniformly contacts the outer circumference of the metal member for an interval of 10 to 30 seconds. The surface layer of the gasket inner circumferential part 1c contacting the outer circumference of the metal member is simultaneously and uniformly fused on the whole circumference. Heating of the metal member by the heater is terminated and the fused portion is cooled and solidified so that the surface layer of the gasket inner circumferential part 1c forms a pore-free fused solidified layer 1'c. As shown in FIG. 3, the thus formed fused solidified layer 1'c is thicker in the middle portion in the direction of thickness of the gasket 1, that is, in the middle portion between the side surfaces of the gasket, than it is at the ends near the side surfaces (such layer sectional shape is called a mountain shape). Preferably, the temperature of the heater is controllable.

By thus permitting the surface layer of the gasket inner circumferential part 1c to form a pore-free fused solidified layer 1'c, osmotic leak from the gasket inner circumferential part 1c can be effectively prevented by the fused solidified layer even though the gasket 1 is made of a porous material. The fused and solidified surface layer 1'c is hardened, but since this layer is very thin and is formed only in the part directly contacting the sealed fluid, the intrinsic characteristics of a porous polytetrafluoroethylene gasket (flexibility, affinity, restoration, etc.) are, on the whole, not sacrificed because of the presence of the fused solidified layer. In other words, except for the point of prevention of osmotic leak, the gasket functions in the same manner as a conventional gasket. In particular, if the fused solidified layer 1'c has a mountain (i.e. bulging in the middle) shape, when the gasket 1 is compressed in the direction of thickness (pressed by the ferrules 2a, 2b), the thin portions at both ends of the fused solidified layer near the side surfaces of the gasket are deformed relatively easily as compared with the middle thick portion, so that the adverse effects of the presence of the fused solidified layer on the elastic characteristics of the gasket (flexibility, affinity, etc.) are sufficiently eliminated.

Experiments have shown that a gasket having a fused solidified layer 1'c formed on the gasket inner circumferential part effectively prevents osmotic leak and is excellent in its gas sealing capacity and airtight holding property.

Tables 1–5 tabulate the results of tests conducted on six gaskets I to VI. All gaskets were made of porous polytetrafluoroethylene and were fabricated under the same conditions using sheets of porous polytetrafluoroethylene. The gaskets I to VI were identical in shape, each being an annular plate shaped as shown in FIG. 1 for use with sanitary piping. Each gasket had an inside diameter of 23.2 mm, an outside diameter of 50.5 mm, and a thickness of 2 mm.

Gasket VI was not heat treated hence it conformed to a conventional gasket of the prior art. In gaskets I to V, fused solidified layers were formed in the gasket inner circumferential part under different heat treatment conditions.

Gasket I was heated for 10 seconds at 420° C., gasket II for 10 seconds at 440° C., gasket III for 20 seconds at 440° C., gasket IV for 30 seconds at 440° C., and gasket V for 10 seconds at 460° C., so that a fused solidified layer in the mountain shape was formed in the inner circumferential part of each gasket. The gaskets were heat treated using a thin metal cylinder having an internal temperature controllable heater as described above.

To confirm the sealing properties of the gaskets I to VI, the following experiment was conducted. The test apparatus comprised a sanitary piping joint structure, similar to that shown in FIG. 2 with the pipings 2a, 2b being closed by plugs and the closed pipings 2a, 2b sealed by the gasket to form an enclosed inspection space. For convenience of explanation, the members of the test apparatus are identified by the same reference numerals corresponding to the similar members in the sanitary piping joining structure shown in FIG. 2.

In a first experiment, each one of the gaskets I to VI was pressed and held between the ferrules 1a, 1b in the same manner as in the sanitary piping joint structure shown in FIG. 2. Compressed air was supplied to, and sealed in, the inspection space. The pressure in the inspection space was initially set at 2.0 kgf/cm², and the pressure in the inspection space was measured after elapsed intervals of time. In the experiment, the tightening torques of the clamp band 5 were 25 kgf·cm an 100 kgf·cm, and the pressure was measured at the end of 1 hour in the former case, and at end of 1 hour and 18 hours in the latter case. The results are shown in Table 1. For the case of conventional gasket VI, the pressure could not be measured after 18 hours because the pressure in the inspection space was completely lost before reaching 18 hours.

From Table 1 it is seen that regardless of the tightening torque, osmotic leak occurred was effectively prevented by gaskets I to V having the fused solidified layers since there was very little decrease in the pressure in the inspection space. On the other hand, in the conventional gasket VI not having the fused solidified layer, the pressure dropped significantly as time passed regardless of the tightening torque because osmotic leak occurred. Therefore, by forming a fused solidified layer in the portion of a polytetrafluoroethylene gasket contacting a sealed fluid, the gas sealing characteristic of the gasket may be greatly enhanced.

In a second experiment, the inspection space of the test apparatus was evacuated by a vacuum pump to a degree of vacuum of −700 mmHg. In a first set of measurements the tightening torque was set at 25 kgf·cm and in a second set of measurements the tightening torque was set at 100 kgf·cm. The pressure in the inspection space was measured at the end of 1 hour at the tightening torque of 25 kgf·cm, and at the end of 1 hour and 2 hours at the tightening torque of 100 kgf·cm. The results are shown in Table 2. In the conventional gasket VI, the measurement in 2 hours is not recorded because the vacuum was completely lost before reaching 2 hours.

From the results shown in Table 2, it is seen that the gaskets I to V having fused solidified layers exhibit a perfect airtight holding function at a large tightening torque (100 kgf·cm), so that the osmotic leak can be prevented securely. Even in the case of a smaller tightening torque (25 kgf·cm), the osmotic leak is effectively prevented so that the gaskets exhibit an excellent airtight holding function. In the conventional gasket VI, on the other hand, increasing the tightening torque is not enough to obtain an airtight holding function and osmotic leak is significant. It is hence understood that, by forming the fused solidified layer in the gasket portions contacting a sealed fluid, the airtight holding property of a gasket made of porous polytetrafluoroethylene may be greatly enhanced.

A third experiment was conducted to determine the effect of steam sterilization on gaskets I–V. After installation of each gasket steam sterilization of the inspection space was carried out three times. The tightening torque was 100 kgf·cm. The initial pressures in the inspection space and the times of making pressure measurements were the same as in the first experiments.

The results of the third experiment are shown in Table 3. Analysis of the results indicates that the gaskets I to V having fused solidified layers exhibit excellent gas sealing performance and airtight holding property even when subjected to such severe conditions as occur during repeated steam sterilizations. A gasket made of porous polytetrafluoroethylene may thus be used in sanitary piping in which steam sterilization treatment is a statutory obligation.

In a fourth experiment, the test apparatus was immersed in a water tank with the axis of the piping being horizontal. Nitrogen gas was supplied to the inspection space, and the inspection space was maintained at a specific pressure. Bubbles rising up to the water surface were captured by a measuring cylinder, to determine the rate of nitrogen gas leakage through the gasket. Gaskets I–V were used in this experiment and the tightening torque was 25 kgf·cm and 40 kgf·cm. Three sets of measurements of the leakage amount were made with the inspection space pressure being maintained at 2, 3 and 4 kgf/cm², respectively. For gaskets III, the leak amount was also measured at a tightening torque of 100 kgf·cm and an inspection space pressure of 4 kgf/cm². With respect to gasket III, pieces subjected to experiment at a tightening torque of 25 kgf·cm were collected from the test apparatus after the experiment, and the collected gaskets (identified as gaskets iii) were put back into the test apparatus at a tightening torque of 100 kfg·cm, and the leakage from the inspection space 4 kgf/cm² was measured in the same manner again while the pressure in the inspection space was maintained at 4 kgf/cm². The results are shown in Table 4.

The data in Table 4 confirms that gaskets having fused solidified layers, regardless of the tightening torque and sealed fluid pressure, can prevent osmotic leak with assurance. In the case of the gaskets iii which were reused, the data confirms a sufficient sealing function and shows that the forming of a fused solidified layer has no adverse effect whatsoever on the intrinsic properties (such as restoration or resilience) of a porous polytetrafluoroethylene gasket.

Furthermore, to study the effects of formation of the fused solidified layer on the flexibility of a gasket, the gasket hardness of gaskets I to VI was measured.

In the hardness measurement, a durometer hardness gauge (type C) of ASKER was used. The measurement was made at three points on the radial line of each gasket: at the inner circumferential end position forming the fused solidified layer (position A in FIG. 1); the position near the protrusion (position B in FIG. 1); and the outer circumferential end position (position C in FIG. 1). To measure the hardness, protrusions 1a, 1b of the gasket were cut off in advance with a cutter knife.

Results of the hardness measurements are shown in Table 5, and confirm the hardness to be nearly the same regardless of whether a fused solidified layer was formed or not. The formation of a fused solidified layer does not spoil the intrinsic property of flexibility of a porous polytetrafluoroethylene gasket.

The invention is not limited to the illustrated embodiment alone, but may be properly changed or modified in a range not departing from the true spirit and basic principles of the invention. For example, the gasket density may be set approximately depending on the seal conditions and others in a range not sacrificing the original characteristics of porous polytetrafluoroethylene. The method of making the osmotic leak preventive structure, that is, the technique for forming the fused solidified layer, is also arbitrary. For example, the fused solidified layer may be formed simultaneously when forming the gasket or when forming the gasket material (sheet material etc.).

Other modifications and substitutions may be made in described embodiment without departing from the spirit and scope of the invention as defined by the appended claims.

TABLE 1

| | | Initial pressure (compressed air): 2.0 kgf/cm² | |
| | | | Tightening torque: 100 kgf · cm |
| Gasket | | Tightening torque | |
| No. | Heat treatment condition | 25 kgf · cm Pressure in 1 hour (kgf/cm²) | Pressure in 1 hour (kgf/cm²) | Pressure in 18 hours (kgf/cm²) |
|---|---|---|---|---|
| I | 420° C. 10 sec. | 1.90 1.90 | 1.98 1.98 | 1.78 1.82 |
| II | 440° C. 10 sec. | 1.88 1.90 | 1.96 1.98 | 1.82 1.84 |
| III | 440° C. 20 sec. | 1.90 1.90 | 1.98 1.98 | 1.86 1.86 |
| IV | 440° C. 30 sec. | 1.88 1.88 | 1.98 1.96 | 1.82 1.84 |
| V | 460° C. 10 sec. | 1.92 1.90 | 1.98 1.98 | 1.90 1.90 |
| VI | None | 0.50 | 1.50 | — |

TABLE 2

| | | Initial pressure (vacuum): −700 mmHg | |
| | | | Tightening torque: 100 kgf · cm |
| Gasket | | Tightening torque: | |
| No. | Heat treatment condition | 25 kgf · cm Pressure in 1 hour (mmHg) | Pressure in 1 hour (mmHg) | Pressure in 2 hours (mmHg) |
|---|---|---|---|---|
| I | 420° C. 10 sec. | −680 −680 | −700 −700 | −700 −700 |
| II | 440° C. 10 sec. | −680 −680 | −700 −700 | −700 −700 |
| III | 440° C. 20 sec. | −690 −690 | −700 −700 | −700 −700 |
| IV | 440° C. 30 sec. | −690 −680 | −700 −700 | −700 −700 |
| V | 460° C. 10 sec. | −690 −690 | −700 −700 | −700 −700 |
| VI | None | −180 | −300 | — |

TABLE 3

| | | Tightening torque: 100 kgf · cm (steam sterilization: conducted 3 times) | | |
| Gasket | | Initial pressure (compressed air): 2.0 kgf · cm | | Initial pressure (vacuum): −700 mmHg | |
| No. | Heat treatment condition | Pressure in 1 hour (kgf/cm²) | Pressure in 18 hours (kgf/cm²) | Pressure in 1 hour (mmHg) | Pressure in 2 hours (mmHg) |
|---|---|---|---|---|---|
| I | 420° C. 10 sec. | 2.00 2.00 | 1.90 1.94 | −700 −700 | −700 −700 |
| II | 440° C. 10 sec. | 2.00 2.00 | 1.96 1.96 | −700 −700 | −700 −700 |
| III | 440° C. 20 sec. | 2.00 2.00 | 1.96 1.96 | −700 −700 | −700 −700 |
| IV | 440° C. 30 sec. | 2.00 2.00 | 1.94 1.96 | −700 −700 | −700 −700 |
| V | 460° C. 10 sec. | 2.00 2.00 | 1.96 1.96 | −700 −700 | −700 −700 |

TABLE 4

| Gasket | | | Leak amount (cc/min) Sealed gas pressure (nitrogen gas) | | |
| No. | Heat treatment condition | Tightening torque (kgf · cm) | 2 kgf · cm² | 3 kgf · cm² | 4 kgf · cm² |
|---|---|---|---|---|---|
| I | 420° C. 10 sec. | 25 40 | $1.80 \times 10^{-2}$ $3.88 \times 10^{-3}$ | $2.50 \times 10^{-2}$ $6.22 \times 10^{-3}$ | $3.40 \times 10^{-2}$ $7.98 \times 10^{-3}$ |
| II | 440° C. 10 sec. | 25 40 | $1.10 \times 10^{-2}$ $2.10 \times 10^{-2}$ | $1.40 \times 10^{-2}$ $3.80 \times 10^{-2}$ | $1.50 \times 10^{-2}$ $4.90 \times 10^{-2}$ |
| III | 440° C. 20 sec. | 25 | $3.19 \times 10^{-3}$ $2.20 \times 10^{-3}$ $1.28 \times 10^{-3}$ | $5.38 \times 10^{-3}$ $2.69 \times 10^{-3}$ $1.92 \times 10^{-3}$ | $7.13 \times 10^{-3}$ $4.36 \times 10^{-3}$ $2.77 \times 10^{-3}$ |
| | | 40 | $4.68 \times 10^{-3}$ $7.66 \times 10^{-3}$ $6.59 \times 10^{-3}$ | $7.50 \times 10^{-3}$ $9.52 \times 10^{-3}$ $8.28 \times 10^{-3}$ | $9.26 \times 10^{-3}$ $1.29 \times 10^{-2}$ $1.11 \times 10^{-2}$ |
| | | 100 | — — | — — | $9.09 \times 10^{-4}$ $1.67 \times 10^{-3}$ |
| iii | 440° C. 20 sec. | 100 | — — — | — — — | $2.42 \times 10^{-3}$ $3.56 \times 10^{-3}$ $2.27 \times 10^{-3}$ |
| IV | 440° C. 30 sec. | 25 40 | $8.33 \times 10^{-3}$ $1.00 \times 10^{-2}$ | $1.30 \times 10^{-2}$ $1.70 \times 10^{-2}$ | $1.50 \times 10^{-2}$ $2.20 \times 10^{-2}$ |
| V | 460° C. 10 sec. | 25 40 | $2.00 \times 10^{-2}$ $5.42 \times 10^{-3}$ | $3.40 \times 10^{-2}$ $9.62 \times 10^{-2}$ | $4.40 \times 10^{-2}$ $1.20 \times 10^{-2}$ |

TABLE 5

| Gasket | | Gasket hardness Position of Measurement | | |
|---|---|---|---|---|
| No. | Heat treatment condition | Inner circumferential end position | Protrusion neigh-boring position | Outer circuferen-tial end position |
| I | 420° C. 10 sec. | 93 | 90 | 91 |
| II | 440° C. 10 sec. | 94 | 90 | 91 |
| III | 440° C. 20 sec. | 94 | 91 | 91 |
| IV | 440° C. 30 sec. | 94 | 90 | 91 |
| V | 460° C. 10 sec. | 93 | 91 | 92 |
| VI | None | 93 | 91 | 91 |

We claim:

1. An annular gasket for sanitary piping wherein a whole body of said gasket, excluding an inner circumferential surface layer, is made of porous polytetrafluoroethylene (PTFE) and a pore-free fused solidified PTFE layer is formed only at said inner circumferential surface layer.

2. A gasket for sanitary piping as claimed in claim 1, wherein the fused solidified layer is thicker in a middle portion between opposite surfaces of the gasket than it is at end portions near said opposite surfaces.

3. A gasket for sanitary piping said gasket consisting of a single annular member of porous polytetrafluoroethylene PTFE having an inner peripheral surface portion only of pore-free PTFE, the pore-free PTFE, at an outer circumferential side thereof, being formed integrally and continuously with the porous PTFE so that the porous PTFE surrounds the pore-free PTFE, the pore-free PTFE having about the same durometer hardness as the porous PTFE.

4. A method of manufacturing a gasket for sanitary piping, said method comprising:

forming an annular gasket of porous polytetrafluoroethylene;

heating an inner circumferential part of said annular gasket to fuse said inner circumferential part thereby forming a pore-free fused layer for contacting a sealed fluid, said heating and fusing being carried out by contacting the entire inner peripheral surface of the gasket with a heated metal member.

5. A method of manufacturing a gasket as claimed in claim 4, wherein the heating of the inner peripheral portion is carried out at a temperature of 420° to 460° C. for a period of 10 to 30 seconds.

6. A method as claimed in claim 5, wherein the heating and fusing is carried out by contacting the entire inner peripheral surface of the gasket with a heated tubular metal member.

7. An annular gasket for sanitary piping, said gasket comprising an annular body consisting of a single piece of polytetrafluoroethylene, said body, except for a region adjacent an inner circumferential surface of said body, consisting of porous polytetrafluoroethylene, said region being comprised of pore-free fused solidified polytetrafluoroethylene.

8. A gasket for sanitary piping as claimed in claim 7, wherein the fused solidified layer is thicker in a middle portion between opposite surfaces of the gasket than it is at end portions near said opposite surfaces.

* * * * *